United States Patent
Kathirgamanathan

(10) Patent No.: US 7,767,315 B2
(45) Date of Patent: Aug. 3, 2010

(54) DOCUMENT AUTHENTIFICATION

(75) Inventor: Poopathy Kathirgamanathan, North Harrow (GB)

(73) Assignee: Merck Patent GmbH, Darmstadt (DE)

( * ) Notice: Subject to any disclaimer, the term of this patent is extended or adjusted under 35 U.S.C. 154(b) by 465 days.

(21) Appl. No.: 10/494,120

(22) PCT Filed: Oct. 21, 2002

(86) PCT No.: PCT/GB02/04761

§ 371 (c)(1), (2), (4) Date: Jun. 7, 2004

(87) PCT Pub. No.: WO03/038010

PCT Pub. Date: May 8, 2003

(65) Prior Publication Data

US 2005/0019603 A1    Jan. 27, 2005

(30) Foreign Application Priority Data

Oct. 31, 2001    (GB) .................................. 0126065.2

(51) Int. Cl.
*C09K 11/06* (2006.01)
*B41M 5/00* (2006.01)

(52) U.S. Cl. ...................... 428/690; 428/195.1; 283/92; 252/301.16

(58) Field of Classification Search ................. 428/690, 428/917, 195.1; 252/301.16; 283/92, 95
See application file for complete search history.

(56) References Cited

U.S. PATENT DOCUMENTS

| | | | | | |
|---|---|---|---|---|---|
| 4,736,425 | A | * | 4/1988 | Jalon | 380/59 |
| 4,833,311 | A | * | 5/1989 | Jalon | 235/491 |
| 4,921,280 | A | * | 5/1990 | Jalon | 283/88 |
| 5,658,494 | A | * | 8/1997 | Bell et al. | 252/301.18 |

FOREIGN PATENT DOCUMENTS

WO    WO 00/79347    12/2000

* cited by examiner

*Primary Examiner*—D. Lawrence Tarazano
*Assistant Examiner*—Camie S Thompson
(74) *Attorney, Agent, or Firm*—David Silverstein; Andover-IP-Law

(57) ABSTRACT

A method producing authenticatable documents by incorporating a fluorescent organometallic complex in the toner or in the paper in which the fluorescent organometallic complex gives off light with a characteristic spectrum when exposed to UV light.

28 Claims, 9 Drawing Sheets m= 0,1,2 etc.
n= 0,1,2 etc.

n = 0,1,2 etc.

m= 0,1,2 etc.
m= 0,1,2 etc.

EDTA

DCTA

DTPA

TTHA

DOCUMENT AUTHENTIFICATION

CROSS-REFERENCE TO RELATED APPLICATIONS

This application claims benefit of the filing date of international application PCT/GB02/04761 filed Oct. 21, 2002, which claims the benefit of the filing date of United Kingdom application no. 0126065.2 filed Oct. 31, 2001.

The present invention relates to a method of producing authenticated documents which are hard to counterfeit.

The problem of marking various objects with identifying marks or codes, which are invisible in normal light, has been addressed several times in the prior art. For instance, U.S. Pat. No. 3,507,655 describes and claims a process for producing marking invisible in natural light but visible in ultraviolet on a plastic substrate exhibiting fluorescent properties, but when exposed to a source of intense optical radiation through a stencil bearing the desired marking pattern, the radiation causes a change in the fluorescence in the substrate in the irradiated area, so that the marking is invisible in ordinary light, but visible under UV illumination.

None of these systems, however, are successfully applicable to normal printing or copying systems and apparatus and they all involve operations additional to printing or copying, causing increased manufacturing complication and costs.

WO 793471 discloses a method for the labelling of printed documents produced by solid toner apparatus, such as a laser printer or a copying machine, with a material the presence of which can be detected using spectrophotometric techniques, and thus can be used to verify the authenticity of the document. The labelling is invisible to the naked eye and does not interfere with the contents of the printed document.

The process of verifying the authenticity of the document involves the excitation of the marked toner with light in the range of 150-800 nm, and the measurement of the light emitted from the excited marked toner by a spectrometer. The document inspected must emit light having a spectrum identical to that preset for the specific document Thus, an emission of light with the wrong spectrum will not identify the document as being authentic.

A range of fluorescent dies are disclosed and a preferred dye is N,N'-Ditridecyl-3,4,9,10-perylenetetracarboxyhc diimide.

French Patent 1471367 and U.S. Pat. No. 4,833,311 disclose a method for the use of rare earth fluorescent chelates to protect documents against counterfeiting and to the detection counterfeit documents.

In this method the rare earth fluorescent chelate is dissolved in a varnish which is used to print a plastic foil which is cut into strips, e.g. 1 mm wide which are introduced into security paper in the form of threads. Alternatively fibres, such as polyamide fibres, containing the rare earth fluorescent chelates are produced, dried and added to paper pulp to produce security paper. In normal light the fibres are colourless, but when excited by ultraviolet light the rare earth fluorescent chelates will fluoresce and emit light of a specific wavelength or wavelength characteristic of the rare earth fluorescent chelates. The emission spectrum is dependant on the temperature and in prior art methods disclosed the detection apparatus is equipped with a spectrofluorimeter to accurately check, in qualitative and quantitative manner, the emitted fluorescent wavelengths as a function of the temperature of the document being authenticated. Again it may include an electro-optical assembly with suitable optical filters to detect the change in the fluorescent wavelengths as a function of temperature and to display directly the result of the double check.

Depending on the kind of coolant used, for instance liquid helium, liquid nitrogen, dry ice or other, the apparatus receiving the documents being authenticated may be open and constantly resupplied, or closed. The cooled trough furthermore may be replaced by a jet of coolant by atomizing e.g. liquid nitrogen onto the document. This requirement to use a range of temperatures is a serious disadvantage and requires the use of expensive cooling apparatus, in addition the fluorescent materials disclosed do not have strong photoluminescent properties and require the use of expensive fluorimeters to detect the colour and rely on subject identification of colour by a user.

DESCRIPTION OF PREFERRED EMBODIMENTS

Figure 1:
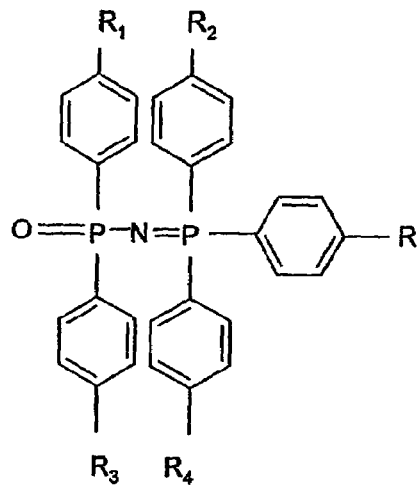
FIGS. 1, 2a and 2b are formulae drawings representing types of compounds Lp in accordance with chemical formula (XVIII) of the invention.

We have now discovered that a range of organometallic complexes can be used to produce readily authenticatable material which can be authenticated at room temperature and which complexes give a strong emission which can be digitized.

The material can be paper, cloth, a plastic material and any material on which the organometallic complexes can be deposited.

In one embodiment of the invention there is provided a method of producing an image on a document in which the paper, or the ink, toner or other material used to form the image incorporates a fluorescent metal organic complex of the type set out below.

The invention also provides a toner composition which comprises a mixture of toner and a fluorescent metal organic complex.

The invention further provides materials documents produced using such a composition.

The fluorescent compounds which can be used in the present invention are of general formula $(L\alpha)_n M$ where M is a rare earth, lanthanide or an actinide, $L\alpha$ is an organic complex and n is the valence state of M.

Other fluorescent compounds which can be used in the present invention are of formula

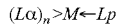

where $L\alpha$ and Lp are organic ligands, M is a rare earth, transition metal, lanthanide or an actinide and n is the valence state of the metal M. The ligands $L\alpha$ can be the same or different and there can be a plurality of ligands Lp which can be the same or different.

For example $(L_1)(L_2)(L_3)(L \ldots )M (Lp)$ where M is a rare earth, transition metal, lanthanide or an actinide and $(L_1)(L_2)(L_3)(L \ldots )$ are the same or different organic complexes and (Lp) is a neutral ligand. The total charge of the ligands $(L_1)(L_2)(L_3)(L \ldots )$ is equal to the valence state of the metal M.

Where there are 3 groups Lα which corresponds to the III valence state of M the complex has the formula $(L_1)(L_2)(L_3)M$ (Lp) and the different groups $(L_1)(L_2)(L_3)$ may be the same or different Lp can be monodentate, bidentate or polydentate and there can be one or more ligands Lp.

Preferably M is metal ion having an unfilled inner shell and the preferred metals are selected from Sm(III), Eu(II), Eu(III), Tb(III), Dy(III), Yb(III), Lu(III), Gd(III), Gd(III) U(III), Tm(III), Ce(III), Pr(III), Nd(III), Pm(III), Dy(III), Ho(III), Er(III), Yb(III) and more preferably Eu(III), Tb(III), Dy(III), Gd(III), Er(III), Yt(III).

Further fluorescent compounds which can be used in the present invention are of general formula $(L\alpha)_n M_1 M_2$ where $M_1$ is the same as M above, $M_2$ is a non rare earth metal, Lα is a as above and n is the combined valence state of $M_1$ and $M_2$. The complex can also comprise one or more neutral ligands Lp so the complex has the general formula $(L\alpha)_n M_1 M_2 (Lp)$, where Lp is as above. The metal $M_2$ can be any metal which is not a rare earth, transition metal, lanthanide or an actinide examples of metals which can be used include lithium, sodium, potassium, rubidium, caesium, beryllium, magnesium, calcium, strontium, barium, copper (I), copper (II), silver, gold, zinc, cadmium, boron, aluminium, gallium, indium, germanium, tin (II), tin (IV), antimony (II), antimony (IV), lead (II), lead (IV) and metals of the first, second and third groups of transition metals in different valence states e.g. manganese, iron, ruthenium, osmium, cobalt, nickel, palladium(II), palladium(IV), platinum(II), platinum(IV), cadmium, chromium. titanium, vanadium, zirconium, tantalum, molybdenum, rhodium, iridium, titanium, niobium, scandium, yttrium.

For example $(L_1)(L_2)(L_3)(L \ldots)M$ (Lp) where M is a rare earth, transition metal, lanthanide or an actinide and $(L_1)(L_2)(L_3)(L \ldots)$ and (Lp) are the same or different organic complexes.

Further organometallic complexes which can be used in the present invention are binuclear, trinuclear and polynuclear organometallic complexes e.g. of formula $(Lm)_x M_1 \leftarrow M_2 (Ln)_y$ e.g.

where L is a bridging ligand and where $M_1$ is a rare earth metal and $M_2$ is $M_1$ or a non rare earth metal, Lm and Ln are the same or different organic ligands Lα as defined above, x is the valence state of $M_1$ and y is the valence state of $M_2$.

In these complexes there can be a metal to metal bond or there can be one or more bridging ligands between $M_1$ and $M_2$ and the groups Lm and Ln can be the same or different.

By trinuclear is meant there are three rare earth metals joined by a metal to metal bond i.e. of formula

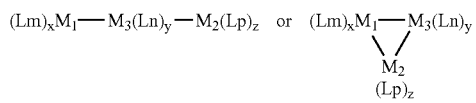

where $M_1$, $M_2$ and $M_3$ are the same or different rare earth metals and Lm, Ln and Lp are organic ligands Lα and x is the valence state of $M_1$, y is the valence state of $M_2$ and z is the valence state of $M_3$. Lp can be the same as Lm and Ln or different.

The rare earth metals and the non rare earth metals can be joined together by a metal to metal bond and/or via an intermediate bridging atom, ligand or molecular group.

For example the metals can be linked by bridging ligands e.g.

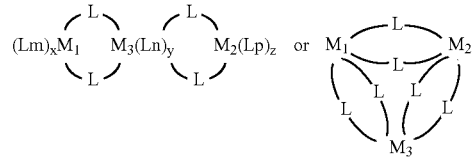

where L is a bridging ligand

By polynuclear is meant there are more than three metals joined by metal to metal bonds and/or via intermediate ligands

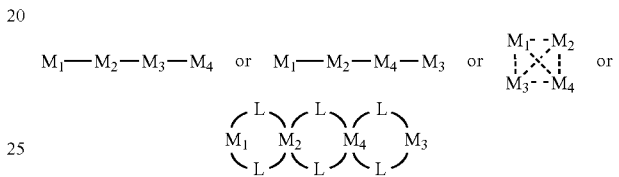

where $M_1$, $M_2$, $M_3$ and $M_4$ are rare earth metals and L is a bridging ligand.

Preferably Lα is selected from β diketones such as those of formulae

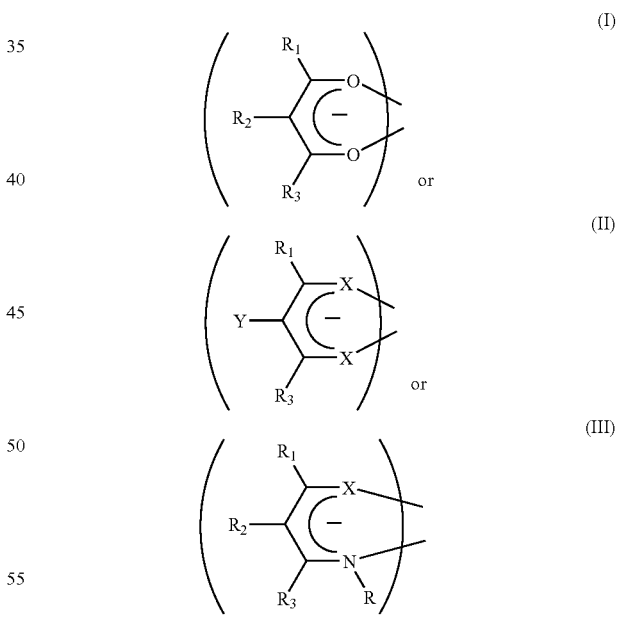

wherein the formulas (I), (II) and (III) above are respectively referred to as "formula (I)", "formula (II)" and "formula (III)" hereinafter, and further where $R_1$, $R_2$ and $R_3$ can be the same or different and are selected from hydrogen, and substituted and unsubstituted hydrocarbyl groups such as substituted and unsubstituted aliphatic groups, substituted and unsubstituted aromatic, heterocyclic and polycyclic ring structures, fluorocarbons such as trifluoryl methyl groups, halogens such as fluorine or thiophenyl groups; $R_1$, $R_2$ and $R_3$ can also form substituted and unsubstituted fused aromatic, heterocyclic and polycyclic ring structures and can be copolymerisable with a monomer e.g. styrene. X is Se, S or O, Y can be hydrogen, substituted or unsubstituted hydrocarbyl groups, such as substituted and unsubstituted aromatic, heterocyclic and polycyclic ring structures, fluorine, fluorocarbons such as trifluoryl methyl groups, halogens such as fluorine or thiophenyl groups or nitrile.

Examples of $R_1$ and/or $R_2$ and/or $R_3$ include aliphatic, aromatic and heterocyclic alkoxy, aryloxy and carboxy groups, substituted and substituted phenyl, fluorophenyl, biphenyl, phenanthrene, anthracene, naphthyl and fluorene groups alkyl groups such as t-butyl, heterocyclic groups such as carbazole.

Some of the different groups Lα may also be the same or different charged groups such as carboxylate groups so that the group $L_1$ can be as defined above and the groups $L_2, L_3 \ldots$ can be charged groups such as

(IV)

wherein the formula (IV) above is referred to hereinafter as "formula (IV)", and further where R is $R_1$ as defined above or the groups $L_1, L_2$ can be as defined above and $L_3 \ldots$ etc. are other charged groups.

$R_1, R_2$ and $R_3$ can also be

(V)

wherein the formula (V) above is referred to hereinafter as "formula (V)", and further where X is O, S, Se or NH.

A preferred moiety $R_1$ is trifluoromethyl $CF_3$ and examples of such diketones are, banzoyltrifluoroacetone, p-chlorobenzoyltrifluoroacetone, p-bromotrifluoroacetone, p-phenyltrifluoroacetone, 1-naphthoyltrifluoroacetone, 2-naphthoyltrifluoroacetone, 2-phenathoyltrifluoroacetone, 3-phenanthoyltrifluoroacetone, 9-anthroyltrifluoroacetonetrifluoroacetone, cinnamoyltrifluoroacetone, and 2-thenoyltrifluoroacetone.

The different groups Lα may be the same or different ligands of formulae

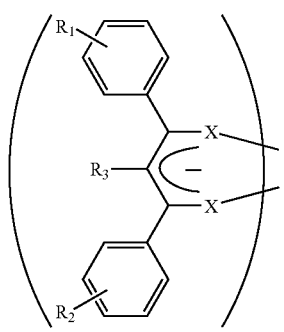

(VI)

wherein the formula (VI) above is referred to hereinafter as "formula (VI)", and further where X is O, S or Se and $R_1, R_2$ and $R_3$ are as above.

The different groups Lα may be the same or different quinolate derivatives such as

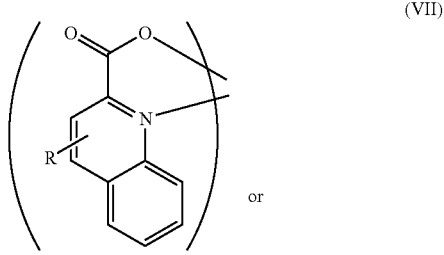

(VII)

or (VIII)

wherein the formula (VII) above is referred to hereinafter as "formula (VII)", and further where R is hydrocarbyl, aliphatic, aromatic or heterocyclic carboxy, aryloxy, hydroxy or alkoxy e.g. the 8 hydroxy quinolate derivatives or

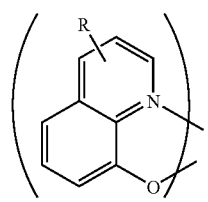

(IX)

or

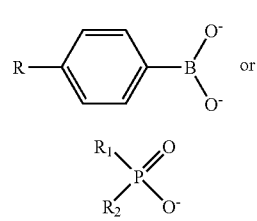

(X)

wherein the formula (VIII) above is referred to hereinafter as "formula (VIII)", and further where R, $R_1$ and $R_2$ are as above or are H or F e.g. $R_1$ and $R_2$ are alkyl or alkoxy groups

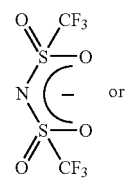

(XI)

or

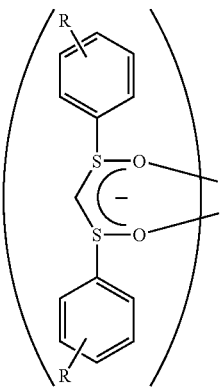

(XII)

wherein the formula (IX) above is referred to hereinafter as "formula (IX)", and further as stated above the different groups Lα may also be the same or different carboxylate groups e.g.

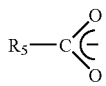
(XIII)

wherein the formula (X) above is referred to hereinafter as "formula (X)", and further where $R_5$ is a substituted or unsubstituted aromatic, polycyclic or heterocyclic ring a polypyridyl group, $R_5$ can also be a 2-ethyl hexyl group so $L_n$ is 2-ethylvesanoate or r % can be a chair structure so that $L_n$ is 2-acetyl cyclohexanoate or Lα can be

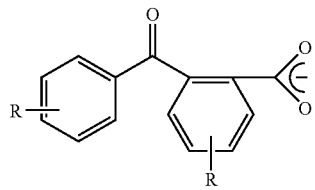
(XIV)

where R is as above e.g. alkyl, allenyl, amino or a fused ring such as a cyclic or polycyclic ring.

The different groups Lα may also be

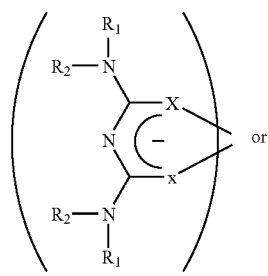
(XIV)

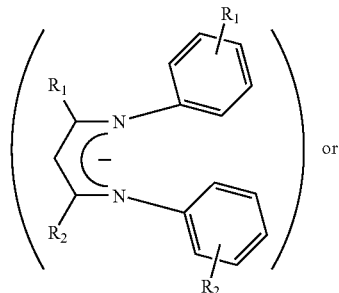
(XV)

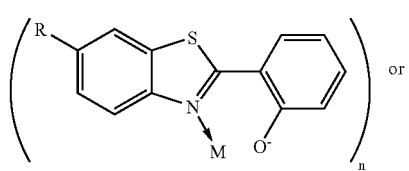
(XVII)

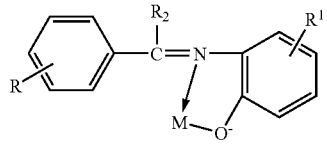
(XVIIa)

(XIVa)  (XV)

wherein the formulas (XIVa), (XV), (XVII) and (XVIIa) above are respectively referred to as "formula (XIVa)", "formula (XV)", "formula (XVII)" and "formula (XVIIa)" hereinafter, and further where R, $R_1$ and $R_2$ are as above.

The groups $L_P$ can be selected from

Figure 2A:
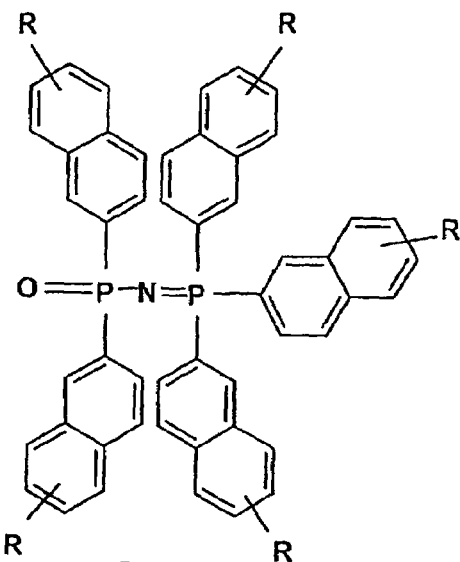
Figure 2B:
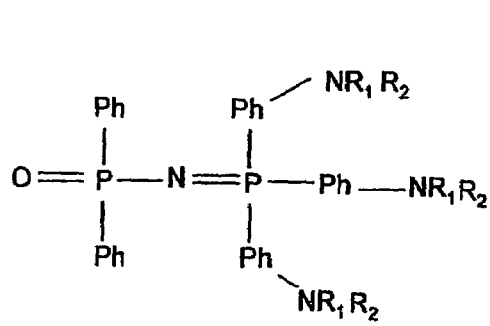

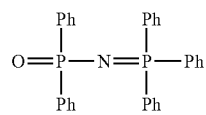
(XVIII)

wherein the formula (XVIII) above is referred to hereinafter as "formula (XVIII)"

Where each Ph which can be the same or different and can be a phenyl (OPNP) or a substituted phenyl group, other substituted or unsubstituted aromatic group, a substituted or unsubstituted heterocyclic or polycyclic group, a substituted or unsubstituted fused aromatic group such as a naphthyl, anthracene, phenanthrene or pyrene group. The substituents can be for example an alkyl, aralkyl, alkoxy, aromatic, heterocyclic, polycyclic group, halogen such as fluorine, cyano, amino. Substituted amino etc. Examples are given in FIGS. 1 and 2 of the drawings where R, $R_1$, $R_2$, $R_3$ and $R_4$ can be the same or different and are selected from hydrogen, hydrocarbyl groups, substituted and unsubstituted aromatic, heterocyclic and polycyclic ring structures, fluorocarbons such as trifluoryl methyl groups, halogens such as fluorine or thiophenyl groups; R, $R_1$, $R_2$, $R_3$ and $R_4$ can also form substituted and unsubstituted fused aromatic, heterocyclic and polycyclic ring structures and can be copolymerisable with a monomer e.g. styrene. R, $R_1$, $R_2$, $R_3$ and $R_4$ can also be unsaturated alkylene groups such as vinyl groups or groups

—C—CH$_2$=CH$_2$—R where R is as above.

$L_p$ can also be compounds of formulae

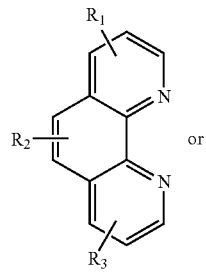
(XVIV)

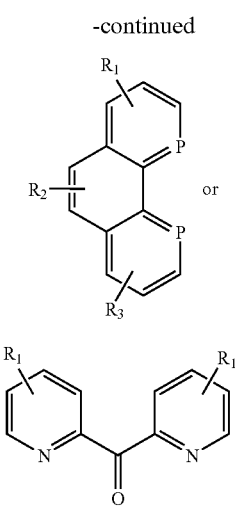

(XX)

Figure 3:
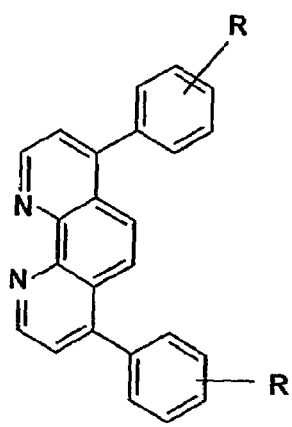
FIG. 3 is a formula drawing representing another type of compound Lp based on bathophen in accordance with the invention.
Figure 4A:
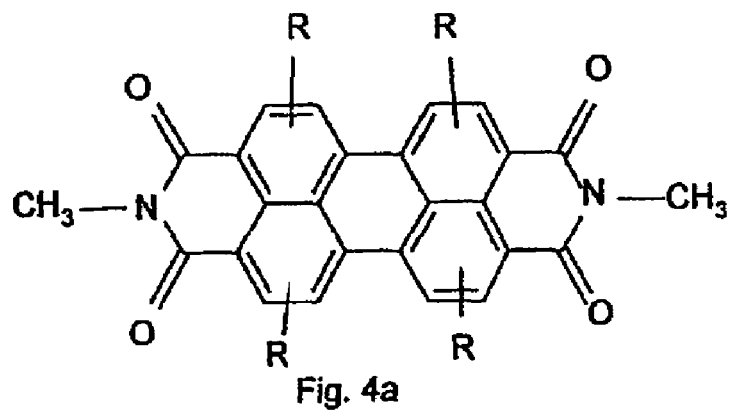
FIGS. 4a to 4l are formulae drawings representing other types of compounds Lp in accordance with this invention.
Figure 4B:
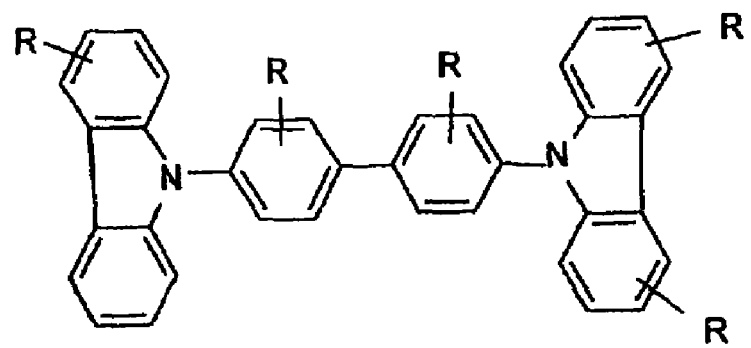
Figure 4C:
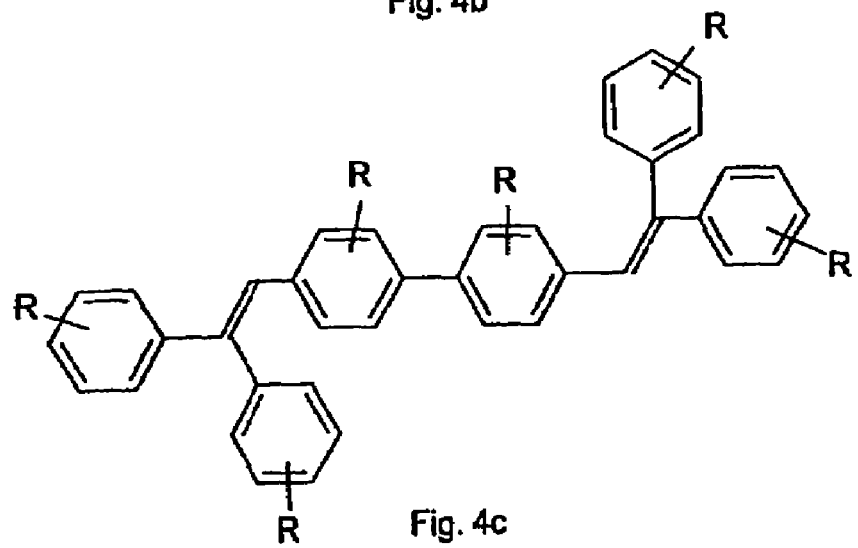
Figure 4D:
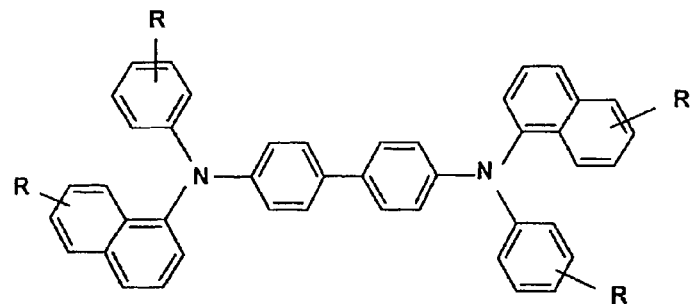
Figure 4E:
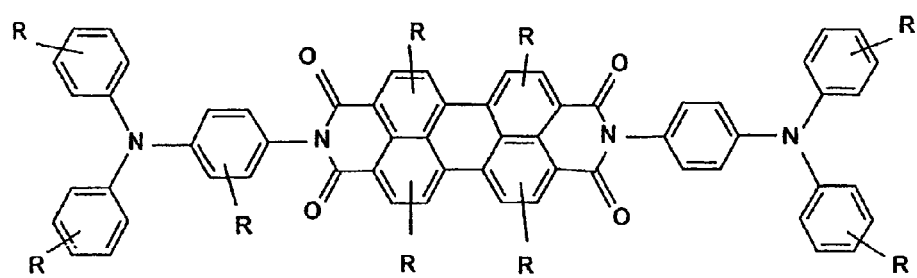
Figure 4F:
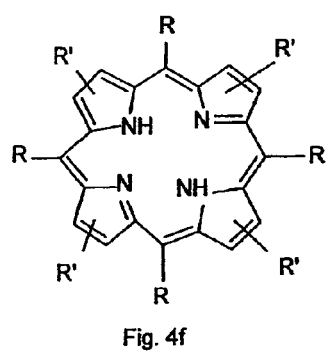
Figure 4G:
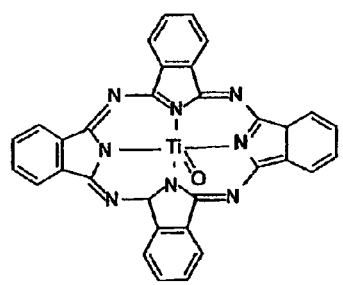
Figure 4H:
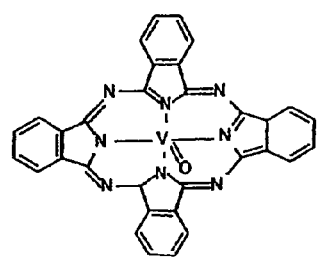
Figure 4I:
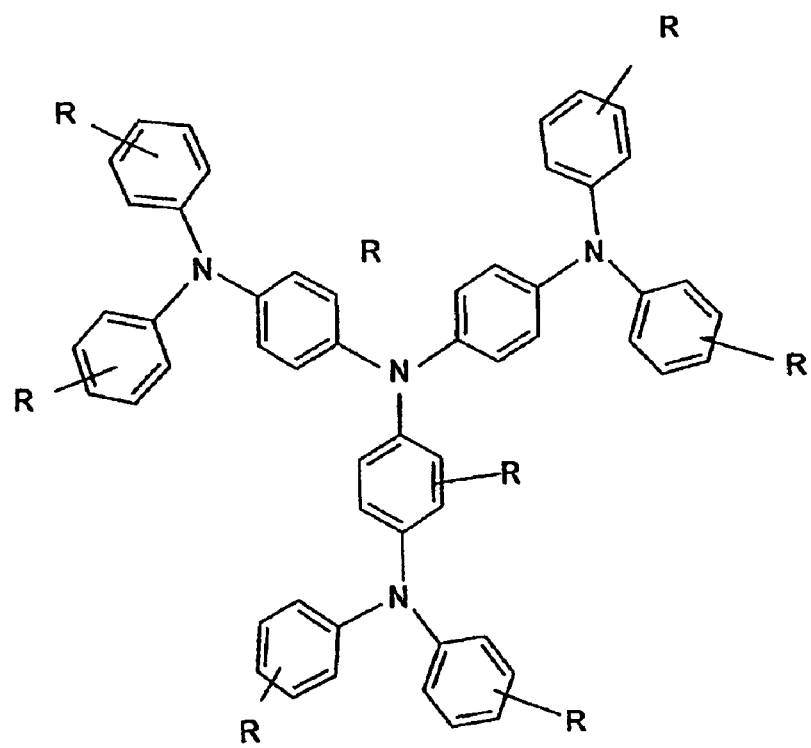
Figure 4J:
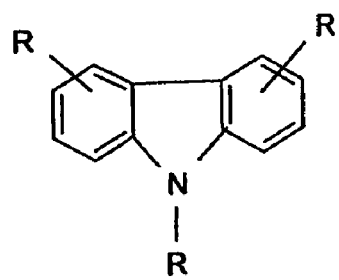
Figure 4K:
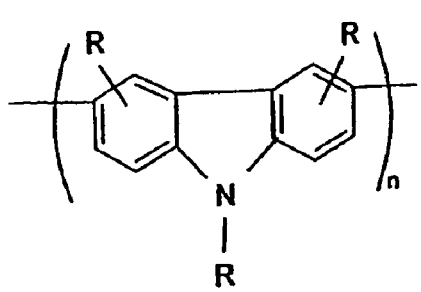
Figure 4L:
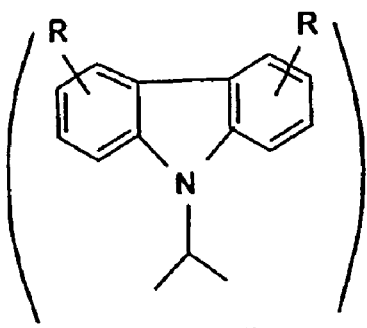

(XXI)

wherein the formulas (XVIV), (XX) and (XXI) above are respectively referred to as "formula (XVIV)", "formula (XIX)" and "formula (XXI)" hereinafter, and further where $R_1$, $R_2$ and $R_3$ are as referred to above, for example bathophen shown in FIG. 3 of the drawings in which R is as above or

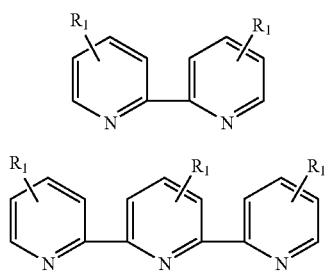

(XXII)

(XXIII)

wherein the formulas (XXII) and (XXIII) above are respectively referred to as "formula (XXII)" and "formula (XXIII)" hereinafter, and further where $R_1$, $R_2$ and $R_3$ are as referred to above.

$L_p$ can also be

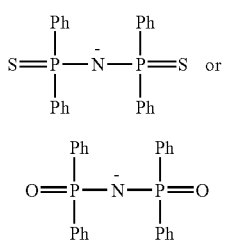

(XXIV)

(XXV)

wherein the formulas (XXIV) and (XXV) above are respectively referred to as "formula (XXIV)" and "formula (XXV)" hereinafter, and further where Ph is as above.

Figure 5A:
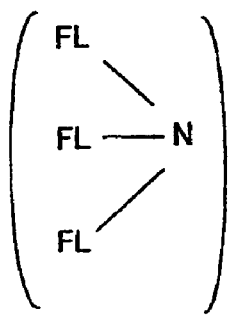
FIGS. 5a to 5f are formulae drawings representing still other types of compounds Lp in accordance with this invention.
Figure 5B:
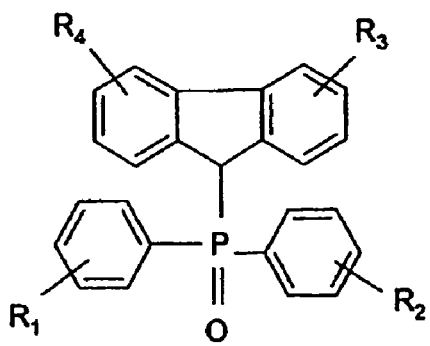
Figure 5C:
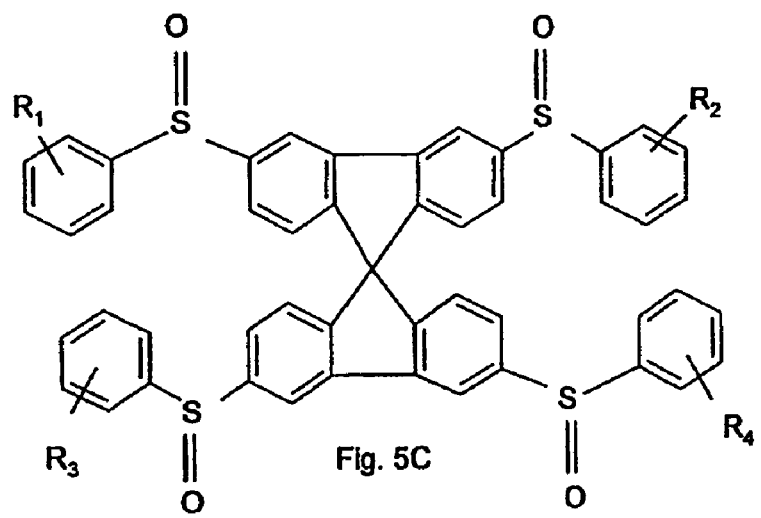
Figure 5D:
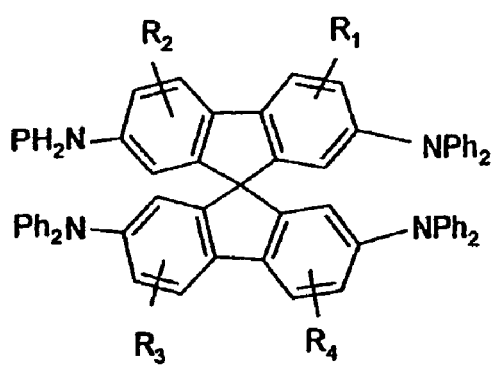
Figure 5:
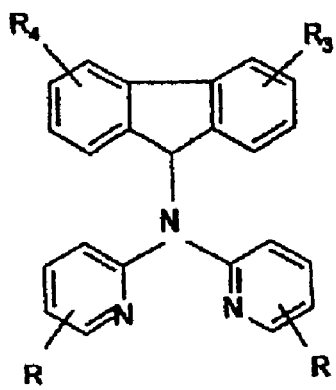
Figure 5F:
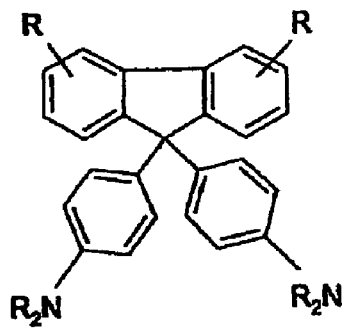
Figure 6A:
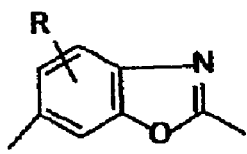
FIGS. 6a to 6e, 7a to 7f and 8a to 8h are formulae drawings representing yet other types of compounds Lp in accordance with this invention.
Figure 6B:
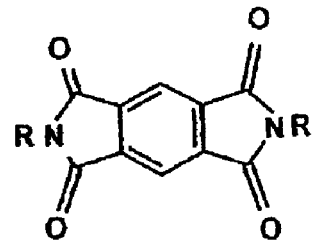
Figure 6C:
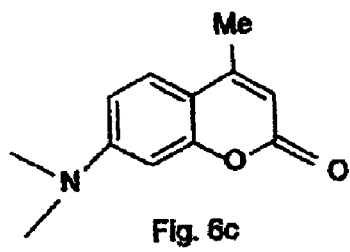
Figure 6D:
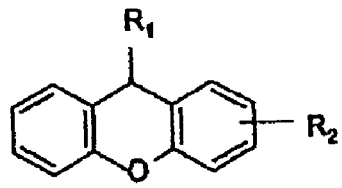
Figure 6E:
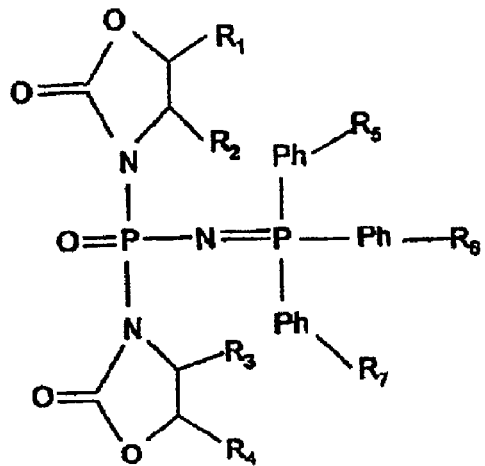
Figure 7A:
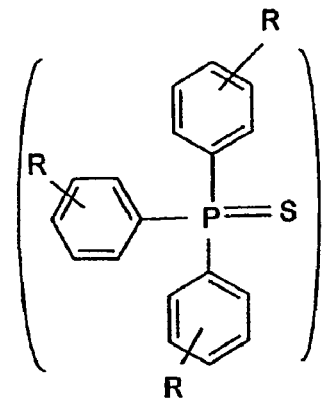
Figure 7B:
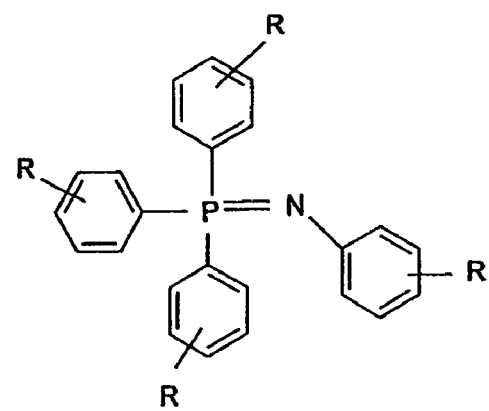
Figure 7C:
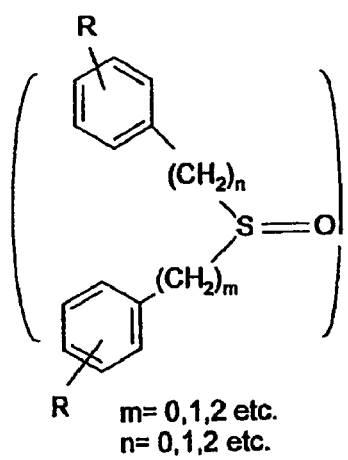
Figure 7D:
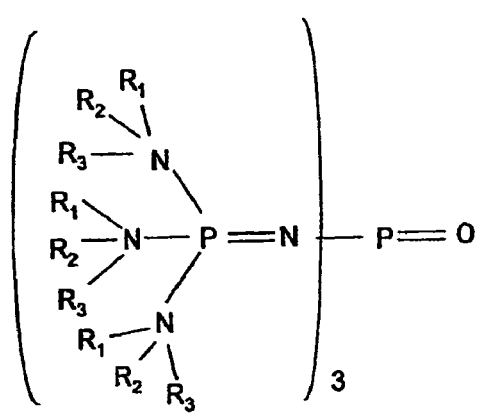
Figure 7E:
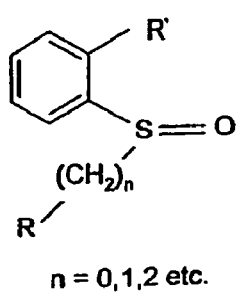
Figure 7F:
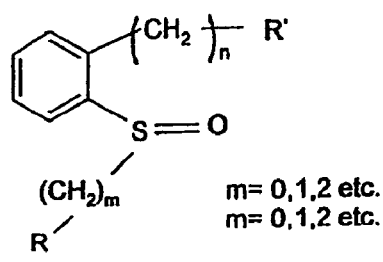
Figure 8A:
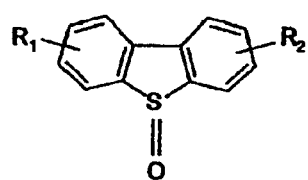
Figure 8B:
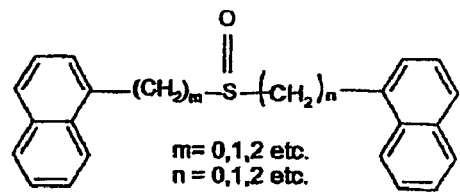
Figure 8C:
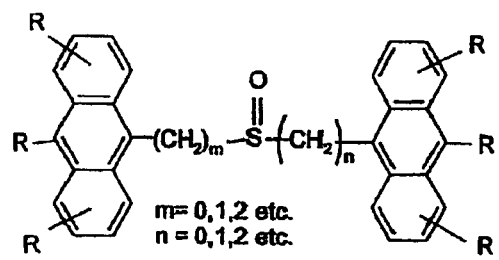
Figure 8D:
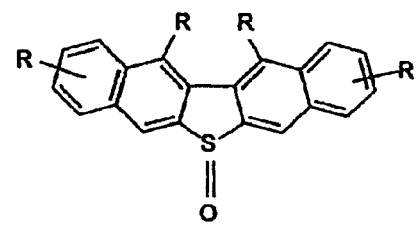
Figure 8E:
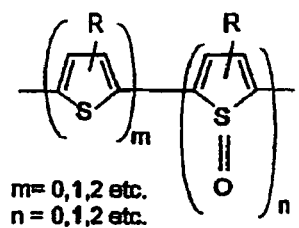
Figure 8F:
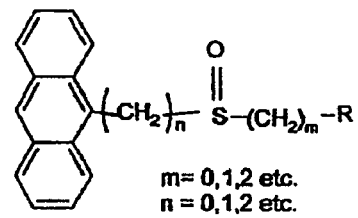
Figure 8G:
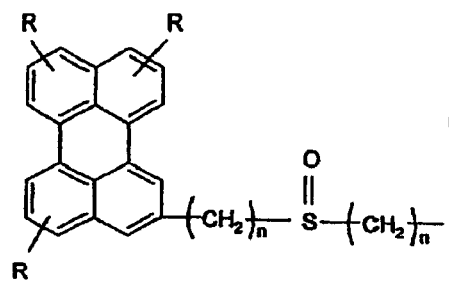
Figure 8H:
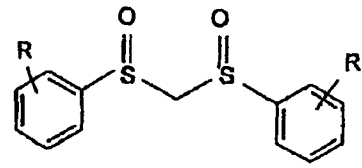

Other examples of $L_p$ chelates are as shown in FIG. 4 and fluorene and fluorene derivatives e.g. a shown in FIG. 5 and compounds of formulae as shown in FIGS. 6 to 8.

Figure 9:
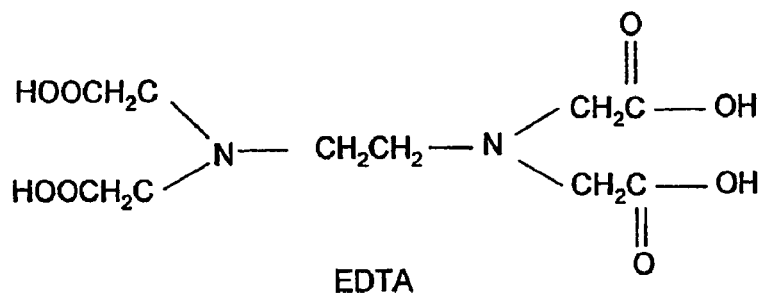
FIG. 9 shows formulae drawings representing polyamines in accordance with this invention shown in their acetic acid form.
Figure 9:
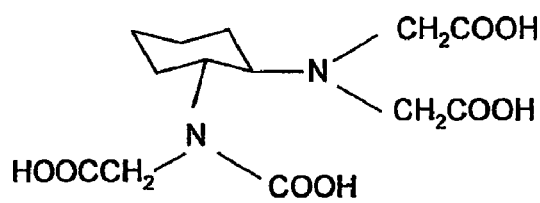
Figure 9:
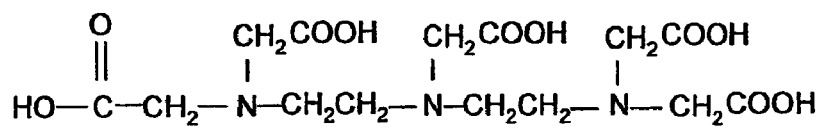
Figure 9:
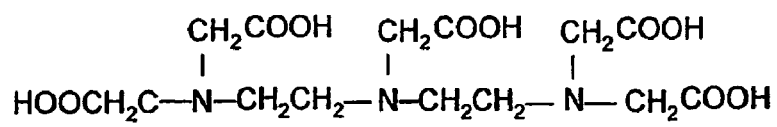

Specific examples of Lα and Lp are tripyridyl and TMHD, and TMHD complexes, α, α', α" tripyridyl, crown ethers, cyclans, cryptans phthalocyanans, porphoryins ethylene diamine tetramine (EDTA), DCTA, DTPA and TTHA. Where TMHD is 2,2,6,6-tetramethyl-3,5-heptanedionato and OPNP is diphenylphosphonimide triphenyl phosphorane. The formulae of the polyamines are shown in FIG. 9 in their acetic acid form.

Other fluorescent materials which can be used include metal quinolates such as lithium quinolate, and non rare earth metal complexes such as aluminium, magnesium, zinc and scandium complexes such as complexes of β-diketones e.g. Tris -(1,3-diphenyl-1-3-propanedione) (DBM) and suitable metal complexes are Al(DBM)$_3$. Zn(DBM)$_2$ and Mg(DBM)$_2$. Sc(DBM)$_3$ etc.

Other fluorescent materials which can be used include the metal complexes of formula

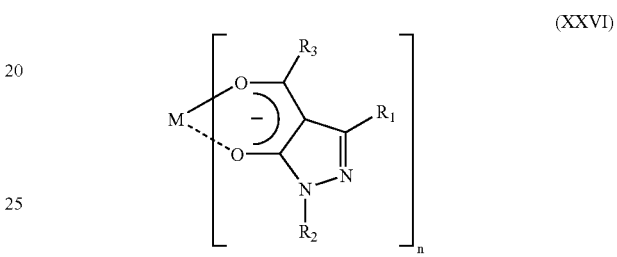

(XXVI)

wherein the formula (XXVI) above is referred to hereinafter as "formula (XXVI)" where M is a metal other than a rare earth, a transition metal, a lanthanide or an actinide; n is the valency of M; $R_1$, $R_2$ and $R_3$ which may be the same or different are selected from hydrogen, hydrocarbyl groups, substituted and unsubstituted aliphatic groups substituted and unsubstituted aromatic, heterocyclic and polycyclic ring structures, fluorocarbons such as trifluoryl methyl groups, halogens such as fluorine or thiophenyl groups or nitrile; $R_1$, and $R_3$ can also be form ring structures and $R_1$, $R_2$ and $R_3$ can be copolymerisable with a monomer e.g. styrene. Preferably M is aluminium and $R_3$ is a phenyl or substituted phenyl group.

The organometallic fluorescent compounds used in the present invention have a unique spectrum and can have more than one peak so that each complex can have a unique colour. By mixing more than one compound together a fluorescent spectrum can be produced which is virtually impossible to reproduce. A form of the process by which toner colours and labelling fluorescents may be associated into toner composition, is described in WO 793471 and comprises the following steps; introducing the labelling compound into an organic solvent, e.g. ethyl alcohol, whereby to produce a first suspension/solution of said labelling compound in said organic solvent; applying a strong sonification for a time sufficient to produce a uniform suspension/solution of said labelling compound particles in said first solution, whereby a moderate heating, typically to about 40° C., is obtained; adding distilled water to said first suspension/solution to an amount that does not cause the precipitation of the labelling compound, whereby to obtain a second suspension/solution of said labelling compound in a mixture of the organic solvent and water, adding the toner particles to said second suspension/solution while stirring; diluting with distilled water to a sufficient extent to cause homogenous precipitation of said labelling compound onto said toner particles, whereby to produce labelled toner particles; stirring the above for an additional few hours, during which generally some organic solvent evaporates, causing further precipitation of the labelling compound.; filtering said labelled toner particles from the liquid phase of said suspension; drying the filtrate under vacuum; and milling and sieving the dried filtrate.

For the fluorescent compounds of the present invention preferred solvents are chloromethanes such as dichloromethane and trichloromethane and toluene etc. typically the concentration in the solvent is from 1% to 10% by volume.

It is important to avoid defects in the process, for instance, the toner particles will be totally covered and will change their colour and their electrostatic properties; or numerous fluorescent crystallites will be formed, that are not bound to toner particles and will not be transferred to the print substrate during the electrostatic process of the printing.

When multiple applications of different labelling fluorescents is desired, one carries out the aforesaid procedure twice or more, once with each labelling fluorescent, or carry out the aforesaid process once by mixing with the water suspension of the toner colours a solution in organic solvent of the mixture of the desired labeling fluorescents.

However, other methods can be used for producing the toner composition containing the toner colours and the labelling fluorescents. This can be done, for instance, by mixing them in solid, finely particulate form by melt coating etc.

The fluorescent compound or compounds used should, as has been said, preferably be colourless and, therefore they may be considered colourless toners. They should also be such as not substantially to alter the colours of the toner colours, although some alteration is tolerable and can be taken into account. Likewise, it is desirable that the colourless toner should not affect substantially the electrostatic and thermal properties of the toner colours, and therefore nor interfere with their deposition on the paper.

When the rare earth chelate is to be incorporated in a security paper in the form of a thread or threads, the process described in U.S. Pat. No. 4,833,311 can be used.

At the printer a varnish containing the rare earth metal chelate is placed into a trough and a propylene film is printed. This printed film is cut into strips constituting security threads incorporated into a security paper during its manufacture.

In U.S. Pat. No. 4,833,311 a process is disclosed in which a rare earth metal chelate or mixture of rare earth metal chelates which emits fluorescent light at a different wavelength at low temperatures is used in order to authenticate a document and a fluorimeter sensitive in the visible and infrared spectra analyzes the fluorescent light and its variation in relation to the temperature of the security paper being UV excited at both ambient and low temperatures. This apparatus may be connected to another memorizing the particular desired rate of alternation and capable of comparing between read-out rate of the moving security paper to be authenticated and the stored rate and thereby to provide a go/no-go response in this automated authentication procedure of a security paper.

In its most simple version the apparatus detecting the fluorescence of the chelates will be a UV exciting source having a support for the documents and a trough holding a low-temperature liquid. The document to be authenticated is presented manually or automatically to this apparatus, exposed to a source of ultra-violet, and it will therefore emit the intrinsic fluorescence of the rare earth at room temperature, whereupon, still being UV excited, it is immersed in the low temperature trough it will emit the intrinsic fluorescence at the low temperature. Once so authenticated, the document is removed from the apparatus and another document is then subjected to the same authentication test. However this need to vary the temperature and the use of an expensive fluorimeter are disadvantages of this process.

With the chelates used in the present invention a much stronger fluorescent emission is obtained and a more simple detector can be used at room temperature the detector can operate by shining ultra violet light on the document and detecting the fluorescent light emitted by photoluminescence. With rare earth chelates used there is a very strong emission which enables lower power detectors to be used which are much cheaper than the detectors which have had to be used with the prior methods.

The spectrum of photoluminescent complexes, especially rare earth chelates, will have a main peak emission frequency which will correspond to the colour of the emission and will also have much smaller side peaks at frequencies different from the main frequency. The size of these side peaks is at least partially dependant on the nature of the ligands used in the complexes and, by using a detector which measures the size of these peaks, it is possible to obtain a series of number which correspond to the ratio of the size of these peaks and the size of the main emission and which will be unique to the particular complex used. There are a very large number of ligand combinations which can be used and so it is possible to provide distinct identification for a very large number of different documents.

When a mixture of photoluminescent complexes are used, each complex will have a peak emission at a specific frequency of a specific size, by having a detector which can measure the size of these peaks it is possible to obtain a series of number which correspond to the ratio of the size of these peaks and which will be unique to the particular mixture of complexes used. There are a very large number of chelate combinations which can be used and so it is possible to provide distinct identification for a very large number of different documents.

In either situation the detector can produce a series of numbers for the document being tested which are the ratios referred to and this series of numbers will be unique for the particular complex or complexes used. It is thus a simple matter for an operator to compare this series of numbers to the series of numbers which should be obtained if the document is genuine without the need for subjective recognition of colours in the prior used methods.

As the marking can be invisible the invention is useful for the identification and authentification of items which could be counterfeited such as items made from ceramics, cloth, plastics, metal etc. and articles made from such materials such as trainers, and other clothing items, Videos, CDs so that it can be ascertained if the article is genuine and, if it originated from a source within the producer's organisation, the location of the source of the item or material can be identified.

The invention claimed is:

1. A method of authenticating or identifying an article that has been marked with or incorporates a fluorescent complex that, when exposed to ultra-violet light, produces a main emission peak at a main emission frequency of the complex and a set of side peaks at frequencies different from the main emission frequency of the complex, said complex being selected from the group consisting of:

A. type (i) materials having the general chemical formula $(L\alpha)_n{>}M{\leftarrow}Lp$ where:
  M is an element selected from the group consisting of lanthanide series elements and actinide series elements,
  n is the valence state of the element M,
  $L\alpha$ is an organic complex which consists of a single ligand or multiple ligands which may be the same or different, and
  Lp is an organic complex which consists of a single ligand or multiple ligands which may be the same or different; and, B. type (ii) materials having the general chemical formula $$(L\alpha)_n M_1 M_2$$

where:
$M_1$ is an element selected from the group consisting of rare earth elements, transition elements, lanthanide series elements and actinide series elements,
$M_2$ is a non rare earth metal,
$L\alpha$ is an organic complex which consists of a single ligand or multiple ligands which may be the same or different, and
n is the combined valence state of $M_1$ and $M_2$,
said method comprising the steps of:
(a) calculating a first series of numbers corresponding to the ratios of the sizes of the side peaks for the fluorescent complex relative to the size of the main emission peak for the fluorescent complex;
(b) shining ultra-violet light onto the article and thereby producing a combination of a main emission peak for the article at a main emission frequency and a set of smaller side peaks for the article at frequencies different from the main frequency;
(c) determining the size of the main emission peak for the article at the main emission frequency of the fluorescent complex, and also determining the sizes of the side peaks for the article at least one or more frequencies different from the main emission frequency;
(d) calculating a second series of numbers corresponding to the ratios of the sizes of the side peaks for the article relative to the size of the main emission peak for the article, said numbers being unique to a the fluorescent complex; and,
(e) authenticating or identifying the article by comparing the similarity of the ratios in the second series of numbers obtained for the article with the corresponding ratios in the first series of numbers.

2. The method according to claim 1 wherein the fluorescent complex is a type (ii) material, and further wherein the element $M_2$ of that material is a metal which is not a rare earth element, transition element, lanthanide series element or actinide series element.

3. A method according to claim 1 wherein the fluorescent complex is a type (ii) material, and further wherein the metal $M_2$ of that material is selected from the group consisting of lithium, sodium, potassium, rubidium, caesium, beryllium, magnesium, calcium, strontium, barium, copper (I), copper (II), silver, gold, zinc, cadmium, boron, aluminum, gallium, indium, germanium, tin (II), tin (IV), antimony (II), antimony (IV), lead (II), lead (IV) and metals of the first, second and third groups of transition metals in different valence states including manganese, iron, ruthenium, osmium, cobalt, nickel, palladium(II), palladium(IV), platinum(II), platinum (IV), chromium, titanium, vanadium, zirconium, tantalum, molybdenum, rhodium, iridium, titanium, niobium, scandium and yttrium.

4. A method according to claim 1 wherein the article is a paper document and further wherein the paper incorporates the fluorescent complex.

5. The method of claim 1 wherein the article is a paper document and further wherein the fluorescent complex is incorporated in the paper in the form of material strips containing the fluorescent complex.

6. The method of claim 1 wherein the article is a paper document and further wherein visible markings on the document comprise a medium which incorporates the fluorescent complex.

7. A method of authenticating or identifying an article that has been marked with or incorporates a mixture of fluorescent complexes that, when exposed to ultra-violet light, produces main emission peaks at the main emission frequencies of the complexes and sets of side peaks at frequencies different from the main emission frequencies of the complexes, said complexes being selected from the group consisting of:
A. type (i) materials having the general chemical formula $$(L\alpha)_n {>} M {\leftarrow} Lp$$

where:
M is an element selected from the group consisting of lanthanide series elements and actinide series elements,
n is the valence state of the element M,
$L\alpha$ is an organic complex which consists of a single ligand or multiple ligands which may be the same or different, and
Lp is an organic complex which consists of a single ligand or multiple ligands which may be the same or different; and,
B. type (ii) materials having the general chemical formula $$(L\alpha)_n M_1 M_2$$

where:
$M_1$ is an element selected from the group consisting of rare earth elements, transition elements, lanthanide series elements and actinide series elements,
$M_2$ is a non rare earth metal,
$L\alpha$ is an organic complex which consists of a single ligand or multiple ligands which may be the same or different, and
n is the combined valence state of $M_1$ and $M_2$,
said method comprising the steps of:
(a) calculating a first series of numbers corresponding to the ratios of the side peaks for the fluorescent complexes relative to the sizes of the main emission peaks for the fluorescent complexes;
(b) shining ultra-violet light onto the article and thereby producing for each complex a combination of a main emission peak for the article at a main emission frequency and a set of smaller side peaks for the article at frequencies different from the main frequency;
(c) determining the sizes of the main emission peaks for the article at the main emission frequency of each fluorescent complex;
(d) calculating a second series of numbers corresponding to the ratios of the sizes of the main emission peaks for the article, said numbers being unique to the particular mixture of fluorescent complexes; and,
(e) authenticating or identifying the article by comparing the similarity of the ratios in the second series of numbers obtained for the article with the corresponding ratios in the first series of numbers.

8. The method according to claim 7 wherein one of the fluorescent complexes is a type (ii) material, and further wherein the element $M_2$ of that material is a metal which is not a rare earth element, transition element, lanthanide series element or actinide series element.

9. A method according to claim 7 wherein one of the fluorescent complexes is a type (ii) material, and further wherein the metal $M_2$ of that materials is selected from the group consisting of lithium, sodium, potassium, rubidium, caesium, beryllium, magnesium, calcium, strontium, barium, copper (I), copper (II), silver, gold, zinc, cadmium, boron, aluminum, gallium, indium, germanium, tin (II), tin (IV), antimony (II), antimony (IV), lead (II), lead (IV) and metals of the first, second and third groups of transition metals in different valence states including manganese, iron, ruthenium, osmium, cobalt, nickel, palladium(II), palladium(IV), platinum(II), platinum(IV), chromium, titanium, vanadium, zirconium, tantalum, molybdenum, rhodium, iridium, titanium, niobium, scandium and yttrium.

10. A method according to claim 7 wherein the article is a paper document that has been marked with the mixture of fluorescent complexes by the steps of: at a printer, placing a varnish containing the fluorescent complexes into a trough; printing a propylene film containing the fluorescent complexes to form a printed film; cutting the printed film into strips constituting security threads; and, incorporating a plurality of the security threads into the paper during its manufacture.

11. A method according to claim 7 wherein the article is a paper document and further wherein the paper incorporates the mixture of fluorescent complexes.

12. A method according to claim 11 wherein the fluorescent complexes are incorporated into the paper by means of security threads produced by a printing process using a toner or varnish containing the fluorescent complexes.

13. The method of claim 7 wherein the article is a paper document and further wherein the mixture of fluorescent complexes is incorporated in the paper in the form of material strips containing the mixture of fluorescent complexes.

14. The method of claim 7 wherein the article is a paper document and further wherein visible markings on the document comprise a medium which incorporates the mixture of fluorescent complexes.

15. A method of authenticating or identifying an article that has been marked with or incorporates one or a mixture of fluorescent complexes that, when exposed to ultra-violet light, produces main emission peaks at the main emission frequencies of the complexes and sets of side peaks at frequencies different from the main emission frequencies of the complexes, said complexes being selected from the group consisting of materials having the general chemical formula $$(L\alpha)_n M_1 M_2 (Lp)$$

where:
- $L\alpha$ is an organic complex which consists of a single ligand or multiple ligands which may be the same or different,
- $Lp$ is an organic complex which consists of a single ligand or multiple ligands which may be the same or different;
- $M_1$ is an element selected from the group consisting of rare earth elements, transition elements, lanthanide series elements and actinide series elements,
- $M_2$ is a non rare earth metal, and
- n is the combined valence state of $M_1$ and $M_2$, where a single fluorescent complex was used for marking the article, said method comprising the steps of:
(a) calculating a first series of numbers corresponding to the ratios of the sizes of the side peaks for the fluorescent complex relative to the size of the main emission peak for the fluorescent complex;
(b) shining ultra-violet light onto the article and thereby producing a combination of a main emission peak for the article at a main emission frequency and a set of smaller side peaks for the article at frequencies different from the main frequency;
(c) determining the size of the main emission peak for the article at the main emission frequency of the fluorescent complex, and also determining the sizes of the side peaks for the article at least one or more frequencies different from the main emission frequency;

(d) calculating a second series of numbers corresponding to the ratios of the sizes of the side peaks for the article relative to the size of the main emission peak for the article, said numbers being unique to the fluorescent complex; and,
(e) authenticating or identifying the article by comparing the similarity of the ratios in the second series of numbers obtained for the article with the corresponding ratios in the first series of numbers; or, alternatively, where a mixture of fluorescent complexes was used for marking the article, said method comprising the steps of:
(f) calculating a first series of numbers corresponding to the ratios of the sizes of the side peaks for the fluorescent complexes relative to the sizes of the main emission peaks for the fluorescent complexes;
(g) shining ultra-violet light onto the article and thereby producing for each complex a combination of a main emission peak for the article at a main emission frequency and a set of smaller side peaks for the article at frequencies different from the main frequency;
(h) determining the sizes of the main emission peaks for the article at the main emission frequency of each fluorescent complex;
(i) calculating a second series of numbers corresponding to the ratios of the sizes of the main emission peaks for the article, said numbers being unique to a particular mixture of fluorescent complexes; and,
(j) authenticating or identifying the article by comparing the similarity of the ratios in the second series of numbers obtained for the article with the corresponding ratios in the first series of numbers.

16. A method according to claim 15 wherein the article is a paper document and further wherein the paper incorporates the fluorescent complex or complexes.

17. The method of claim 15 wherein the article is a paper document and further wherein the fluorescent complex or complexes is or are incorporated in the paper in the form of material strips containing the fluorescent complex or complexes.

18. The method of claim 15 wherein the article is a paper document and further wherein visible markings on the document comprise a medium which incorporates the fluorescent complex or complexes.

19. A method of authenticating or identifying an article that has been marked with or incorporates one or a mixture of fluorescent complexes that, when exposed to ultra-violet light, produces main emission peaks at the main emission frequencies of the complexes and sets of side peaks at frequencies different from the main emission frequencies of the complexes, said complexes being selected from the group consisting of materials having one of the general chemical formulas:

(i)

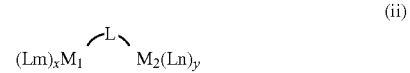
(ii)

where L is a bridging ligand and where $M_1$ is a rare earth element and $M_2$ is either the same as $M_1$ or a non rare earth element, Lm and Ln are the same or different organic ligands, x is the valence state of $M_1$, and y is the valence state of $M_2$;

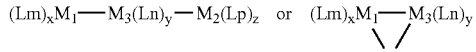

(iii) $(Lm)_xM_1$—$M_3(Ln)_y$—$M_2(Lp)_z$  or  (iv) $(Lm)_xM_1$—$M_3(Ln)_y$ with $M_2(Lp)_z$ bridging where, in chemical formulas (iii) and (iv), $M_1$, $M_2$ and $M_3$ are the same or different rare earth elements, Lm, Ln and Lp are organic ligands, x is the valence state of $M_1$, y is the valence state of $M_2$, and z is the valence state of $M_3$, further wherein Lp can be the same as Lm and $L_n$ or different;

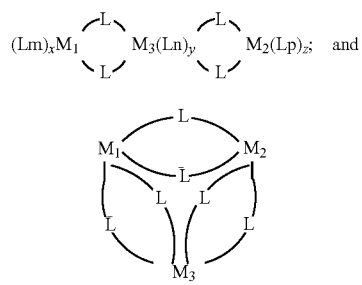

where, in chemical formulas (v) and (vi), L is a bridging ligand whereby rare earth elements and non rare earth elements are joined together by a metal-to-metal bond and/or via an intermediate bridging atom, ligand or molecular group, and wherein at least three metals are joined by metal-to-metal bonds and/or via intermediate ligands, where a single fluorescent complex was used for marking the article, said method comprising the steps of:
(a) calculating a first series of numbers corresponding to the ratios of the sizes of the side peaks for the fluorescent complex relative to the size of the main emission peak for the fluorescent complex;
(b) shining ultra-violet light onto the article and thereby producing a combination of a main emission peak for the article at a main emission frequency and a set of smaller side peaks for the article at frequencies different from the main frequency;
(c) determining the size of the main emission peak for the article at the main emission frequency of the fluorescent complex, and also determining the sizes of the side peaks for the article at least one or more frequencies different from the main emission frequency;
(d) calculating a second series of numbers corresponding to the ratios of the sizes of the side peaks for the article relative to the size of the main emission peak for the article, said numbers being unique to the fluorescent complex; and,
(e) authenticating or identifying the article by comparing the similarity of the ratios in the second series of numbers obtained for the article with the corresponding ratios in the first series of numbers; or,
alternatively, where a mixture of fluorescent complexes was used for marking the article, said method comprising the steps of:
(f) calculating a first series of numbers corresponding to the ratios of the sizes of the side peaks for the fluorescent complexes relative to the sizes of the main emission peaks for the fluorescent complexes;
(g) shining ultra-violet light onto the article and thereby producing for each complex a combination of a main emission peak for the article at a main emission frequency and a set of smaller side peaks for the article at frequencies different from the main frequency;
(h) determining the sizes of the main emission peaks for the article at the main emission frequency of each fluorescent complex;
(i) calculating a second series of numbers corresponding to the ratios of the sizes of the main emission peaks for the article, said numbers being unique to a particular mixture of fluorescent complexes; and,
(j) authenticating or identifying the article by comparing the similarity of the ratios in the second series of numbers obtained for the article with the corresponding ratios in the first series of numbers.

20. The method according to claim 19 wherein, in the formulas (i), (ii), (v) and (vi), the element $M_2$ is a metal which is not a rare earth element, transition element, lanthanide series element or actinide series element.

21. A method according to claim 19 wherein the metal $M_2$ is selected from the group consisting of lithium, sodium, potassium, rubidium, caesium, beryllium, magnesium, calcium, strontium, barium, copper (I), copper (II), silver, gold, zinc, cadmium, boron, aluminum, gallium, indium, germanium, tin (II), tin (IV), antimony (II), antimony (IV), lead (II), lead (IV) and metals of the first, second and third groups of transition metals in different valence states including manganese, iron, ruthenium, osmium, cobalt, nickel, palladium(II), palladium(IV), platinum(II), platinum(IV), chromium, titanium, vanadium, zirconium, tantalum, molybdenum, rhodium, iridium, titanium, niobium, scandium and yttrium.

22. A method according to claim 19 wherein the article is a paper document and further wherein the paper incorporates the fluorescent complex or complexes.

23. The method of claim 19 wherein the article is a paper document and further wherein the fluorescent complex or complexes is or are incorporated in the paper in the form of material strips containing the fluorescent complex or complexes.

24. The method of claim 19 wherein the article is a paper document and further wherein visible markings on the document comprise a medium which incorporates the fluorescent complex or complexes.

25. A method of authenticating or identifying an article that has been marked with or incorporates a fluorescent complex which gives a strong emission which can be digitized and that, when exposed to ultra-violet light, produces a main emission peak at a main emission frequency of the complex and a set of side peaks at frequencies different from the main emission frequency of the complex, said complex being selected from the group consisting of:

A. type (i) materials having the general chemical formula $(L\alpha)_n$>M←Lp 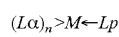

where:
M is an element selected from the group consisting of lanthanide series elements and actinide series elements,
n is the valence state of the element M,
Lα is an organic complex which consists of a single ligand or multiple ligands which may be the same or different, and
Lp is an organic complex which consists of a single ligand or multiple ligands which may be the same or different; and, B. type (ii) materials having the general chemical formula $$(L\alpha)_n M_1 M_2$$

where:
M$_1$ is an element selected from the group consisting of rare earth elements, transition elements, lanthanide series elements and actinide series elements,
M$_2$ is a non rare earth metal,
L$\alpha$ is an organic complex which consists of a single ligand or multiple ligands which may be the same or different, and
n is the combined valence state of M$_1$ and M$_2$,
said method comprising the following steps all carried out at about room temperature:
(a) calculating a first series of numbers corresponding to the ratios of the sizes of the side peaks for the fluorescent complex relative to the size of the main emission peak for the fluorescent complex;
(b) shining ultra-violet light onto the article and thereby producing a combination of a main emission peak for the article at a main emission frequency and a set of smaller side peaks for the article at frequencies different from the main frequency;
(c) determining the size of the main emission peak for the article at the main emission frequency of the fluorescent complex, and also determining the sizes of the side peaks for the article at least one or more frequencies different from the main emission frequency;
(d) calculating a second series of numbers corresponding to the ratios of the sizes of the side peaks for the article relative to the size of the main emission peak for the article, said numbers being unique to the fluorescent complex; and,
(e) authenticating or identifying the article by comparing the similarity of the ratios in the second series of numbers obtained for the article with the corresponding ratios in the first series of numbers.

26. A method of authenticating or identifying an article that has been marked with or incorporates a mixture of fluorescent complexes which gives a strong emission which can be digitized and that, when exposed to ultra-violet light, produces main emission peaks at the main emission frequencies of the complexes and sets of side peaks at frequencies different from the main emission frequencies of the complexes, said complexes being selected from the group consisting of:
A. type (i) materials having the general chemical formula $$(L\alpha)_n{>}M{\leftarrow}Lp$$

where:
M is an element selected from the group consisting of lanthanide series elements and actinide series elements,
n is the valence state of the element M,
L$\alpha$ is an organic complex which consists of a single ligand or multiple ligands which may be the same or different, and
Lp is an organic complex which consists of a single ligand or multiple ligands which may be the same or different; and,
B. type (ii) materials having the general chemical formula $$(L\alpha)_n M_1 M_2$$

where:
M$_1$ is an element selected from the group consisting of rare earth elements, transition elements, lanthanide series elements and actinide series elements,
M$_2$ is a non rare earth metal,
L$\alpha$ is an organic complex which consists of a single ligand or multiple ligands which may be the same or different, and
n is the combined valence state of M$_1$ and M$_2$,
said method comprising the following steps all carried out at about room temperature:
(a) calculating a first series of numbers corresponding to the ratios of the sizes of the side peaks for the fluorescent complexes relative to the sizes of the main emission peaks for the fluorescent complexes;
(b) shining ultra-violet light onto the article and thereby producing for each complex a combination of a main emission peak for the article at a main emission frequency and a set of smaller side peaks for the article at frequencies different from the main frequency;
(c) determining the sizes of the main emission peaks for the article at the main emission frequency of each fluorescent complex;
(d) calculating a second series of numbers corresponding to the ratios of the sizes of the main emission peaks for the article, said numbers being unique to a particular mixture of fluorescent complexes; and,
(e) authenticating or identifying the article by comparing the similarity of the ratios in the second series of numbers obtained for the article with the corresponding ratios in the first series of numbers.

27. A method of authenticating or identifying an article that has been marked with or incorporates one or a mixture of fluorescent complexes which gives a strong emission which can be digitized and that, when exposed to ultra-violet light, produces main emission peaks at the main emission frequencies of the complexes and sets of side peaks at frequencies different from the main emission frequencies of the complexes, said complexes being selected from the group consisting of materials having the general chemical formula $$(L\alpha)_n M_1 M_2 (Lp)$$

where:
L$\alpha$ is an organic complex which consists of a single ligand or multiple ligands which may be the same or different,
Lp is an organic complex which consists of a single ligand or multiple ligands which may be the same or different;
M$_1$ is an element selected from the group consisting of rare earth elements, transition elements, lanthanide series elements and actinide series elements,
M$_2$ is a non rare earth metal, and
n is the combined valence state of M$_1$ and M$_2$,
where a single fluorescent complex was used for marking the article, said method comprising the following steps all carried out at about room temperature:
(a) calculating a first series of numbers corresponding to the ratios of the sizes of the side peaks for the fluorescent complex relative to the size of the main emission peak for the fluorescent complex;
(b) shining ultra-violet light onto the article and thereby producing a combination of a main emission peak for the article at a main emission frequency and a set of smaller side peaks for the article at frequencies different from the main frequency;
(c) determining the size of the main emission peak for the article at the main emission frequency of the fluorescent complex, and also determining the sizes of the side peaks for the article at least one or more frequencies different from the main emission frequency;
(d) calculating a second series of numbers corresponding to the ratios of the sizes of the side peaks for the article relative to the size of the main emission peak for the article, said numbers being unique to the fluorescent complex; and,
(e) authenticating or identifying the article by comparing the similarity of the ratios in the second series of numbers obtained for the article with the corresponding ratios in the first series of numbers; or,
alternatively, where a mixture of fluorescent complexes was used for marking the article, said method comprising the following steps all carried out at about room temperature:
(f) calculating a first series of numbers corresponding to the ratios of the sizes of the side peaks for the fluorescent complexes relative to the sizes of the main emission peaks for the fluorescent complexes;
(g) shining ultra-violet light onto the article and thereby producing for each complex a combination of a main emission peak for the article at a main emission frequency and a set of smaller side peaks for the article at frequencies different from the main frequency;
(h) determining the sizes of the main emission peaks for the article at the main emission frequency of each fluorescent complex;
(i) calculating a series of numbers corresponding to the ratios of the sizes of the main emission peaks for the article, said numbers being unique to a particular mixture of fluorescent complexes; and,
(j) authenticating or identifying the article by comparing the similarity of the ratios in the second series of numbers obtained for the article with the corresponding ratios in the first series of numbers.

28. A method of authenticating or identifying an article that has been marked with or incorporates one or a mixture of fluorescent complexes which gives a strong emission which can be digitized and that, when exposed to ultra-violet light, produces main emission peaks at the main emission frequencies of the complexes and sets of side peaks at frequencies different from the main emission frequencies of the complexes, said complexes being selected from the group consisting of materials having one of the general chemical formulas:

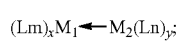
(i)

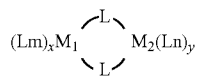
(ii)

where L is a bridging ligand and where $M_1$ is a rare earth element and $M_2$ is either the same as $M_1$ or a non rare earth element, Lm and Ln are the same or different organic ligands, x is the valence state of $M_1$, and y is the valence state of $M_2$;

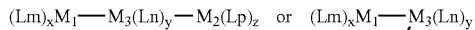
(iii) (iv)

where, in chemical formulas (iii) and (iv), $M_1$, $M_2$ and $M_3$ are the same or different rare earth elements, Lm, Ln and Lp are organic ligands, x is the valence state of $M_1$, y is the valence state of $M_2$, and z is the valence state of $M_3$, further wherein Lp can be the same as Lm and Ln or different;

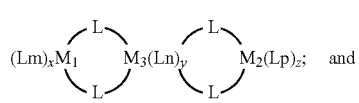
(v)

(vi)

where, in chemical formulas (v) and (vi), L is a bridging ligand whereby rare earth elements and non rare earth elements are joined together by a metal-to-metal bond and/or via an intermediate bridging atom, ligand or molecular group, and wherein at least three metals are joined by metal-to-metal bonds and/or via intermediate ligands, where a single fluorescent complex was used for marking the article, said method comprising the following steps all carried out at about room temperature:
(a) calculating a first series of numbers corresponding to the ratios of the sizes of the side peaks for the fluorescent complex relative to the size of the main emission peak for the fluorescent complex;
(b) shining ultra-violet light onto the article and thereby producing a combination of a main emission peak for the article at a main emission frequency and a set of smaller side peaks for the article at frequencies different from the main frequency;
(c) determining the size of the main emission peak for the article at the main emission frequency of the fluorescent complex, and also determining the sizes of the side peaks for the article at least one or more frequencies different from the main emission frequency;
(d) calculating a second series of numbers corresponding to the ratios of the sizes of the side peaks for the article relative to the size of the main emission peak for the article, said numbers being unique to the fluorescent complex; and,
(e) authenticating or identifying the article by comparing the similarity of the ratios in the second series of numbers obtained for the article with the corresponding ratios in the first series of numbers; or,
alternatively, where a mixture of fluorescent complexes was used for marking the article, said method comprising the following steps all carried out at about room temperature:
(f) calculating a first series of numbers corresponding to the ratios of the sizes of the side peaks for the fluorescent complexes relative to the sizes of the main emission peaks for the fluorescent complexes;
(g) shining ultra-violet light onto the article and thereby producing for each complex a combination of a main emission peak for the article at a main emission frequency and a set of smaller side peaks for the article at frequencies different from the main frequency;
(h) determining the sizes of the main emission peaks for the article at the main emission frequency of each fluorescent complex;
(i) calculating a second series of numbers corresponding to the ratios of the sizes of the main emission peaks for the article, said numbers being unique to a particular mixture of fluorescent complexes; and,
(j) authenticating or identifying the article by comparing the similarity of the ratios in the second series of numbers obtained for the article with the corresponding ratios in the first series of numbers.

* * * * *